MICROWAVE SIGNAL MODULATOR COMPRISING A HYBRID JUNCTION AND NONRECIPROCAL PHASE SHIFTER

Filed Sept. 20, 1967

INVENTOR
Tore Torstensson Fjällbrant
BY Hane and Nydick
Attorneys

United States Patent Office 3,475,699

Patented Oct. 28, 1969

3,475,699

MICROWAVE SIGNAL MODULATOR COMPRISING A HYBRID JUNCTION AND A NONRECIPROCAL PHASE SHIFTER

Tore Torstensson Fjällbrant, Stagorg, Fjaras, Sweden, assignor to Telefonaktiebolaget L M Ericsson, Stockholm, Sweden, a corporation of Sweden Filed Sept. 20, 1967, Ser. No. 669,061
Claims priority, application Sweden, Nov. 30, 1966, 16,357/66
Int. Cl. H03c 1/38
U.S. Cl. 332—31 3 Claims

ABSTRACT OF THE DISCLOSURE

A microwave signal modulator comprises a four-point hybrid junction, and a two-port nonreciprocal phase shifter including a ferrite element. One port of a pair of ports of the junction receives the carrier signal, the other port of that pair is the output port of the modulator. The two ports of the other pair of ports are connected to the two ports of the phase shifter, respectively. When a modulating signal is applied to the phase shifter the ferrite element is subjected to a varying magnetic field causing the ferrite element to amplitude modulate the carrier signal passing through the phase shifter.

The present invention refers to an arrangement for amplitude modulation of signals of microwave frequency.

When amplitude modulating microwave signals it is common to let the modulating signal rotate the polarization plane of the carrier wave for example in such a way that a rectangular wave guide, in which the carrier wave propagates in its basic mode (TE–10 mode), having its electric field intensity vector in parallel with the short ends of the guide, is connected to a circular wave guide. In the center of the circular wave guide there is an axial ferrite rod, across which there is a longitudinal magnetic field. A rectangular wave guide is connected to the other end of the circular wave guide, whereby the carrier wave transmitted to it will have its electric field intensity vector rotated in correspondence with the intensity of the magnetic field. Since only the component of the field which is in parallel with the short sides of the wave guide will initiate an outgoing wave, it is obviously possible to modulate the carrier wave by varying the magnetic field with a modulating signal. This procedure has however two considerable disadvantages. Firstly, the junction between the rectangular wave guide and the circular require a precise mechanical latch, secondly, the arrangement will not withstand high power effects, as the ferrite rod is applied where the greatest field intensities occur.

An object of the invention is to provide a simple microwave signal modulator which will withstand high power levels.

Briefly, the invention is directed to a microwave signal modulator comprising a hybrid junction having two pairs of ports. One port of one pair is adapted to receive a carrier signal, while the other port of the same pair is the output port. A two-port nonreciprocal phase shifter has each of its ports connected to a different port of the other pair of ports of the hybrid junction. The phase shifter includes a phase shifting means, which in response to a modulating signal amplitude modulates the carrier signal passing through the phase shifter.

Figure 1:
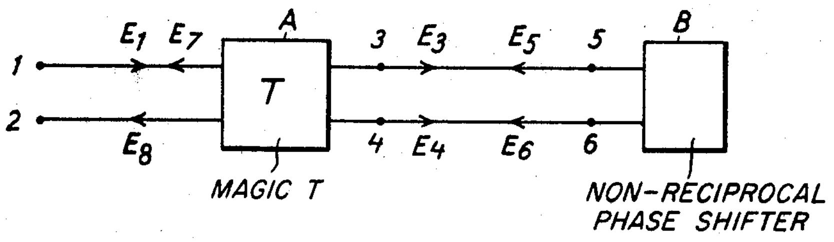
Figure 2:
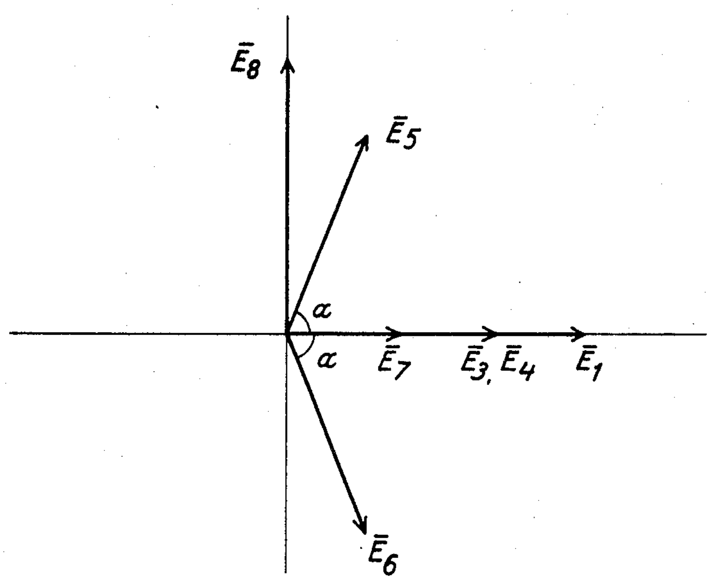

The invention will be more fully described by means of an embodiment shown in the accompanying drawing, in which FIG. 1 shows a block diagram of the arrangement according to the invention and FIG. 2 is a vector diagram explaining the principle of the invention.

In FIG. 1A is a hybrid junction which according to the example is presumed to be a so-called magic T, the ports of which are labelled 1, 2, 3 and 4. Such a hybrid junction has the property that if two signals with the field intensities $E_1$ and $E_2$ are supplied to the ports 1 and 2 a signal with the field intensity $$\frac{E_1+E_2}{\sqrt{2}}$$

is obtained at port 3 and at port 4 is obtained a signal with the field intensity $$\frac{E_1-E_2}{\sqrt{2}}$$

In the same way signals are obtained on port 1 and 2 respectively when signals are supplied to the ports 3 and 4, i.e., the hybrid junction is reciprocal. B is a nonreciprocal phase shifter, including a ferrite element, the input ports of which are labelled 5 and 6 and are connected to the ports 3 and 4 respectively of the hybrid junction. The nonreciprocal phase shifter has the property of phase shifting a signal incident on port 6 by a determined angle $\alpha$, and the signal incident on port 5 by an angle $-\alpha$. The phase shifter can for example be a rectangular wave guide in which is placed a ferrite element, across which is applied a modulating magnetic field. The angle $\alpha$ will hereby vary with the intensity of the magnetic field.

In FIG. 2 the vector $\overline{E_1}$ represents a signal with the field intensity $E_1$ that is to be modulated and is supplied to port 1 in FIG. 1. Depending on the fact that no signal is supplied to port 2 this signal transmits the output signals $\overline{E_3}$ and $\overline{E_4}$, each with the amplitude $$\frac{E_1}{\sqrt{2}}$$

at the ports 3 and 4. The signal $\overline{E_4}$ is supplied from port 4 through the phase shifter via the ports 6 and 5 and is phase shifted by the angle $+\alpha$, while the signal $\overline{E_3}$ is supplied via the ports 5 and 6 through the phase shifter and will then be phase shifted by the angle $-\alpha$. The size of the angle will thereby be depending on the magnetic field intensity across the ferrite element and this field intensity varies with the modulating signal. The phase shifted signals $\overline{E_6}$ and $\overline{E_5}$, respectively, are supplied to the ports 4 and 3 respectively of the hybrid junction. Hereby the signal $$\overline{E_7}=\frac{\overline{E_5}+\overline{E_6}}{\sqrt{2}}$$

is obtained at port 1 and the signal $$\overline{E_8}=\frac{\overline{E_5}-\overline{E_6}}{\sqrt{2}}$$

at port 2. Apparently the amplitude of the signals $\overline{E_7}$ and $\overline{E_8}$ will depend on the angle $\alpha$, that is on the intensity of the magnetic field in the phase shifter, whereby an amplitude modulation of the signal $\overline{E_1}$ is obtained.

The invention is of course not limited to the use of the hybrid junction described above but is applicable to all hybrid junctions, for example the so-called 90°-hybrid, having the property that if a signal is supplied to the first and second ports the sum of the signal from the first port, multiplied by $1/\sqrt{2}$, and the signal from the second port, phase shifted by an angle $\varphi$ and multiplied by $1/\sqrt{2}$, is obtained on the third port, and on the fourth port is obtained the sum of the signal from the second port, multiplied by $1/\sqrt{2}$, and the signal from the first port, phase shifted by the angle $180° - \varphi$ and multiplied by $1/\sqrt{2}$. In the described example, that is in the "magic T," said angle was $\varphi = 0$, that is the input signals are added at port 3 in the same phase and at port 4 in phase opposition. In the 90°—hybrid, however, said angle is $\varphi = 90°$, whereby at port 3 one of the signals is added, phase shifted by 90°, and at port 4 the other input signal is added, phase shifted by 90°.

I claim:

1. A modulator comprising: a hybrid junction, said hybrid junction having a first pair of ports and a second pair of ports, a microwave signal applied to either port of either pair of ports, the power of the applied signal transmitted in substantially equal quantities from each of the ports of the other pair of ports and substantially no power transmitted from the remaining port; a nonreciprocal phase shifter having first and second ports, said nonreciprocal phase shifter including magnetic field sensitive means that vary the phase shift of signals passing therethrough in accordance with the amplitude of a modulating signal applied thereto; one port of the first pair of ports of said hybrid junction receiving a carrier signal; means for connecting one port of the second pair of ports of said hybrid junction to one port of said nonreciprocal phase shifter; means for connecting the other port of the second pair of ports of said hybrid junction to the other port of said nonreciprocal phase shifter; and the other port of the first pair of ports of said hybrid junction transmitting a modulated carrier signal due to said one port of the first pair of ports of said hybrid junction receiving a carrier signal, and a modulating signal applied to said magnetic field sensitive means.

2. The modulator of claim 1 wherein said hybrid junction is a 90°-hybrid microwave device.

3. The modulator of claim 1 wherein said hybrid junction is a magic T microwave device.

References Cited

UNITED STATES PATENTS

| | | | |
|---|---|---|---|
| 2,832,054 | 4/1958 | Fox | 333—24.1 X |
| 2,973,512 | 2/1961 | Walsh. | |
| 3,221,276 | 11/1965 | Stern | 333—11 |

H. K. SAALBACH, Primary Examiner

PAUL L. GENSLER, Assistant Examiner

U.S. Cl. X.R.

332—51; 333—11, 24.1